United States Patent
Zhang et al.

(10) Patent No.: US 7,596,219 B1
(45) Date of Patent: Sep. 29, 2009

(54) METHOD AND SYSTEM FOR PREVENTING ENDLESS LOOPING DURING TELEPHONE CALL SET UP

(75) Inventors: Baoquan Zhang, Overland Park, KS (US); Karen H. Miller, Overland Park, KS (US); Charles Woodson, Peculiar, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 904 days.

(21) Appl. No.: 10/821,565

(22) Filed: Apr. 9, 2004

(51) Int. Cl.
*H04M 3/00* (2006.01)

(52) U.S. Cl. .......................... 379/221.09; 379/221.11; 379/221.14

(58) Field of Classification Search ............ 379/114.15, 379/207.4, 211.02, 221.09, 211.11, 221.14
See application file for complete search history.

(56) References Cited

U.S. PATENT DOCUMENTS

| | | | |
|---|---|---|---|
| 3,626,109 A | 12/1971 | Bartlett et al. | |
| 5,018,194 A | 5/1991 | Suzuki et al. | |
| 5,790,638 A | 8/1998 | Bertacchi | |
| 5,889,782 A * | 3/1999 | Dendi | 370/524 |
| 5,889,847 A | 3/1999 | Copley et al. | |
| 6,014,379 A * | 1/2000 | White et al. | 370/389 |
| 6,157,640 A | 12/2000 | Valentine | |
| 6,167,256 A | 12/2000 | Yla-Outinen et al. | |
| 6,195,425 B1 * | 2/2001 | Farris | 379/230 |
| 6,292,656 B1 * | 9/2001 | Donovan et al. | 455/406 |
| 6,324,271 B1 | 11/2001 | Sawyer et al. | |
| 6,373,930 B1 * | 4/2002 | McConnell et al. | 379/114.28 |
| 6,385,446 B2 | 5/2002 | Palviainen et al. | |
| 6,404,875 B2 | 6/2002 | Malik et al. | |
| 6,647,259 B1 | 11/2003 | Boyle et al. | |
| 6,741,695 B1 * | 5/2004 | McConnell et al. | 379/229 |
| 6,785,534 B2 * | 8/2004 | Ung | 455/406 |
| 6,845,152 B2 * | 1/2005 | Taff et al. | 379/211.02 |
| 6,963,583 B1 * | 11/2005 | Foti | 370/467 |
| 7,142,657 B2 | 11/2006 | Woodson et al. | |
| 7,263,354 B2 * | 8/2007 | Naim et al. | 455/422.1 |
| 2001/0023183 A1 | 9/2001 | Palviainen et al. | |
| 2002/0168060 A1 * | 11/2002 | Huie | 379/211.02 |
| 2002/0168061 A1 | 11/2002 | Bruening et al. | |
| 2003/0059018 A1 | 3/2003 | Eber et al. | |

OTHER PUBLICATIONS

3GPP2—TIA/EIA-41-D Enhancements for Internationalization Version 1.0.0 Jan. 28, 2000.*
Office Action from U.S. Appl. No. 10/259,896, dated Sep. 1, 2004.

(Continued)

*Primary Examiner*—Ahmad F Matar
*Assistant Examiner*—Khai N Nguyen

(57) ABSTRACT

A method for setting up a call to a subscriber station. The method comprises, at a first telecommunications platform, receiving a first request to set up a call to a subscriber station. The first request is processed at a second telecommunications platform. The second platform provides a second request to set up the call to the subscriber station, where the second request includes a non-loop parameter. The second request is received at the first platform and the first platform responsively sends a service request including the non-loop parameter to a third telecommunications platform. The third platform detects the non-loop parameter and, in response to at least the non-loop parameter, directs the first platform to set up the call to the subscriber station.

25 Claims, 4 Drawing Sheets

OTHER PUBLICATIONS

Office Action from U.S. Appl. No. 10/259,896, dated Jun. 7, 2005.
Office Action from U.S. Appl. No. 10/259,896, dated Jul. 14, 2005.
Office Action from U.S. Appl. No. 10/259,896, dated Sep. 16, 2005.
Office Action from U.S. Appl. No. 10/259,896, dated Jan. 25, 2006.
Office Action from U.S. Appl. No. 10/259,896, dated May 26, 2006.

* cited by examiner

ISUP IAM

| CALLING PARTY NUMBER | CALLED PARTY NUMBER | REDIRECTING NUMBER | ORIGINAL CALLED NUMBER |
|---|---|---|---|
| 360-555-0000 | 913-555-5555 | 999-999-9999 | (BLANK) |
| 300 | 310 | 320 | 330 |

| CALLING PARTY NUMBER | CALLED PARTY NUMBER | REDIRECTING NUMBER |
|---|---|---|
| 360-555-0000 | 913-555-5555 | 999-999-9999 |
| 340 | 350 | 360 |

FIG. 3B

METHOD AND SYSTEM FOR PREVENTING ENDLESS LOOPING DURING TELEPHONE CALL SET UP

FIELD OF THE INVENTION

This invention relates to telecommunications. More particularly, this invention relates to systems and methods for setting up telephone calls.

DESCRIPTION OF RELATED ART

The number of services being offered by telecommunication carriers to their subscribers continues to increase. Such services include various messaging services, such as text messaging, short message service messaging, among others. Other types of services that are available to subscribers are pre-paid calling services, custom ring-back tone services, among numerous other services. In order to implement these services (which may be referred to as enhanced services), telecommunications carriers may provide a service node (SN) and may route calls to the SN for handling, such as for execution of service logic associated with providing these services. For example, a call may be routed to a SN for a call placed to a subscriber that has a custom ring back tone defined. A custom ring back tone may be a tone and/or audio clip that a calling party hears when waiting for the called subscriber to answer. When the call is routed to the SN, the SN executes service logic that results in the custom ring-back tone being played for the calling party while the called subscriber's telephone is rung.

A current approach that is used to implement such enhanced telecommunication services is the use of contiguous telephone number blocks. In such an approach, subscribers to such enhanced services (e.g., pre-paid calling in this example) have consecutively numbered station (e.g., telephone or mobile telephone) identification numbers and/or consecutive phone numbers. For example, two subscriber stations in such a contiguous number block may have, respectively, the phone numbers (360) 555-0000 and (360) 555-0001. In this situation, when a request to set up a call to a subscriber station that is associated with a phone number within the contiguous block is received at a telecommunications switch, the switch would determine that the number being called (the subscriber station) is within the contiguous block and would responsively set the call up to a SN (e.g. place a voice trunk call along with associated Signaling System 7 signals) for appropriate call processing. However, with the ever growing number of enhanced services available to subscribers, as well as the advent of mobile number portability (which allows mobile telecommunications subscribers to keep their telephone number and port that number to a new carrier), it is virtually impossible to group the numbers (e.g., telephone numbers or station identification numbers) for subscribers that use specific enhanced services into contiguous blocks.

Another common arrangement that is used to provide enhanced services to subscriber stations that are not in contiguous number blocks is the use of telecommunications networks that employ Advanced Intelligent Network (AIN) triggers, or Wireless Intelligent Network (WIN) triggers. As is known, WIN is the wireless/mobile telecommunications implementation of AIN. In such arrangements, when a call is being set up to a subscriber station, the subscriber station's home switch (or an originating switch associated with a calling station) encounters a trigger (AIN/WIN) and responsively contacts a service control point (SCP) for call processing assistance. The SCP may then apply service logic included in the SCP and determine that the call to the subscriber station should be routed to a service node (SN) for special handling, such as for pre-paid call processing. Thus, the SCP will then direct the switch to set up the call to the SN.

Once the SN completes its handling of the call, the SN may then work to complete the set up of the call to the called mobile station. To do so, the SN may send a call setup request, which would once again reach the switch (the subscriber station's home switch or the originating switch). When this occurs, the switch would once again contact the SCP for call processing assistance (as a result of an AIN/WIN trigger, as the case may be). The SCP will once again apply service logic and, because the call is still identified as a call to the same subscriber, the SCP will direct the switch to set up the call to the SN. In such a situation, an endless loop condition results with the call being routed between the SCP and the SN by the switch, rather than setting up the call to the subscriber station. In order to avoid such endless loop conditions, alternative approaches for setting up calls to subscriber stations that use enhanced telecommunications services are desirable.

SUMMARY

A method for setting up a phone call to a subscriber station that prevents endless looping includes inserting a non-loop parameter into a call setup request. A non-loop parameter may be a predefined series of characters and/or digits, a special character, or any other appropriate information that is inserted into a call setup request. In such a method, a call is received at a switch, which then communicates with a service control point (SCP) for call processing assistance. The SCP directs the switch to set the call up to a service node (SN) for further call processing (e.g., processing related to an enhanced telecommunications service). The SN then completes call processing and contacts the switch with another call setup request including the non-loop parameter. The switch will again contact the SCP for call processing assistance. However, this second request from the switch to the SCP will include the non-loop parameter. As a result of detecting the non-loop parameter, the SCP will instruct the switch to set the call up to the subscriber station.

A system for setting up a telephone call includes a switch for receiving a first request to set up the telephone call to a subscriber station. The switch may be a mobile telephone switch or a public switched telephone network switch. The switch is operatively coupled with a service control point (SCP), such that the switch may contact the SCP for call processing assistance in response to receiving the request to set up the call. The SCP includes service logic for providing such call processing assistance to the switch.

The system further includes a SN that is operatively coupled with the switch. The SN includes service logic associated with providing one or more telecommunication services (e.g., enhanced telecommunication services) to the subscriber station. In this respect, the SN may comprise pre-paid call processing service logic and/or custom ring-back tone processing service logic, for example. The SN further includes service logic for generating and sending a second request to the switch to set up the call to the subscriber station. This further service logic includes one or more instructions for inserting a non-loop parameter in the second request. Likewise, the SCP includes further service logic for recognizing the non-loop parameter in the second request and for responsively providing guidance to the switch to set up the call to the subscriber station. That is, as a result of recognizing the non-loop parameter, the SCP will instruct the switch to set up the call to the subscriber station rather than the SN, thus preventing the previously discussed endless loop situation.

An alternative system for setting up a telephone call may also comprise a signal transfer point (STP). In such an embodiment, the operative coupling of the switch and the SCP and the switch and the SN may be accomplished via the STP. In this embodiment, the STP may provide for interfacing a plurality of switches with the SCP, such that the SCP may provide call processing assistance to each of the plurality of switches. This is beneficial in that a dedicated SCP is not employed with each switch of the plurality, which may reduce the amount of equipment employed to implement such a system.

A method for setting up a call to a subscriber station includes receiving, at a telecommunications switch, a first request to set up the call to the subscriber station. In response to the first request, the switch sends a first query to a service control point (SCP) seeking call processing guidance. The SCP then sends, to the switch, a response to the first query. The response directs the switch to set up the call to a service node (SN). The SN then applies service logic, such as pre-paid call processing and/or custom ring-back tone processing, for example. The SN then provides, to the switch, a second request to set up the call to the subscriber station. The second request includes a non-loop parameter inserted by the SN. The second request is then received by the switch.

In response to the second request, the switch sends, to the SCP, a second query seeking call processing guidance, where the second query includes the non-loop parameter. The SCP includes service logic for detecting the non-loop parameter in the second query. Upon detecting the non-loop parameter, the SCP responsively sends, to the switch, a directive to set up the call to the subscriber station rather than to the SN. This directive is received at the switch, and the switch then sets the call up to the subscriber station, as opposed to the SN, thus avoiding the endless loop condition discussed above.

These and other aspects will become apparent to those of ordinary skill in the art by reading the following detailed description, with reference where appropriate to the accompanying drawings. Further, it should be understood that the embodiments noted in this summary are not intended to limit the scope of the invention as claimed.

BRIEF DESCRIPTION OF THE DRAWINGS

Embodiments of the present invention are described herein with reference to the drawings, in which:

FIGS. 3A and 3B are diagrams illustrating, respectively, an ISUP LAM an SS7 message, each including a non-loop parameter in accordance with an embodiment of the invention.

DETAILED DESCRIPTION

It is noted that this disclosure will discuss embodiments generally in the context of providing a pre-paid calling telecommunication service. It will be appreciated, however, the invention is not limited to pre-paid calling services and the invention may be employed with respect to any number of telecommunications services that may be implemented using service logic on one or more platforms in a telecommunication system.

System for Setting Up a Call

Figure 1:
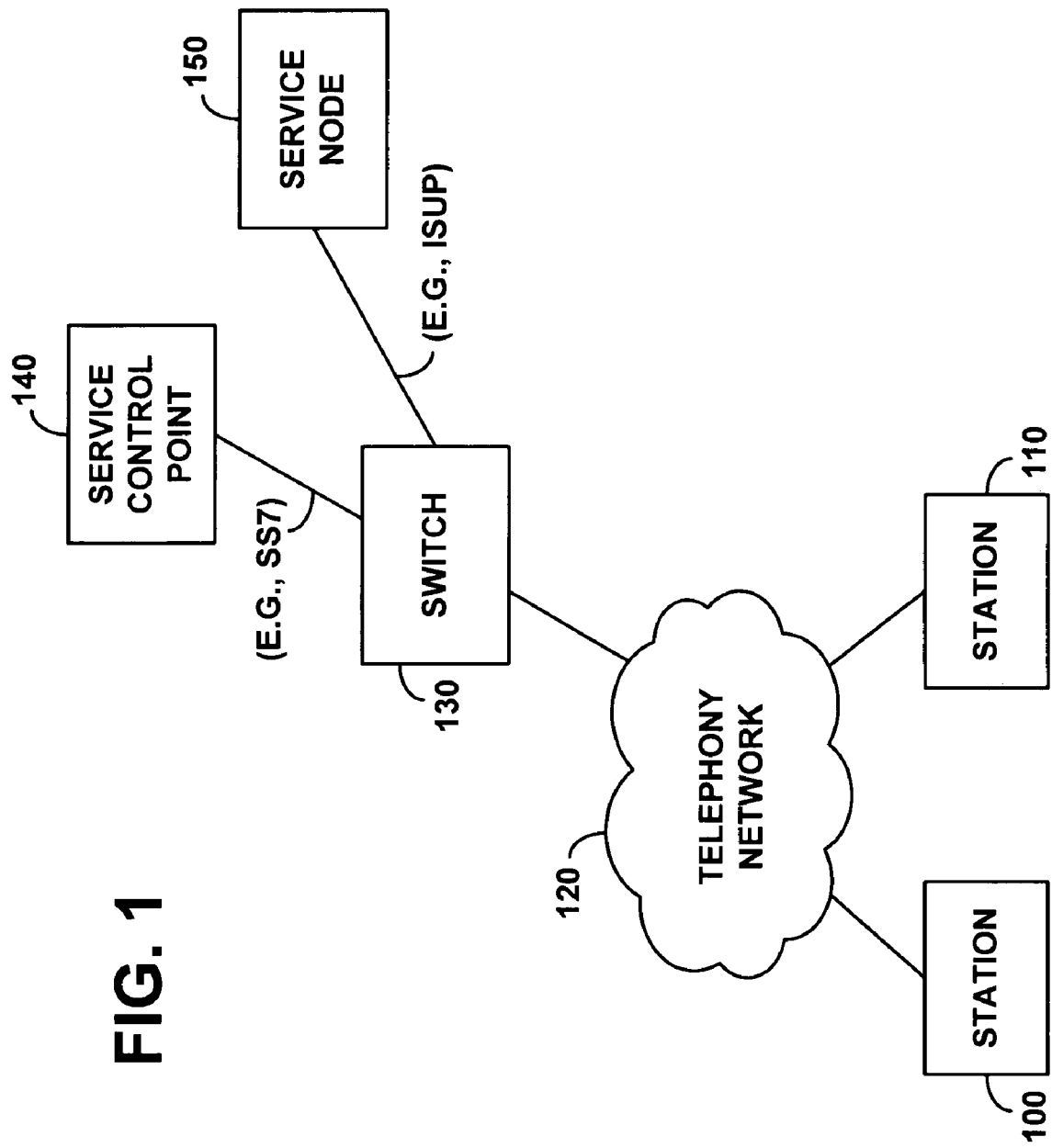
FIG. 1 is a block diagram of telecommunications system in accordance with an embodiment of the invention.

Referring now to FIG. 1, a block diagram of a system for setting up telephone calls is shown. The system shown in FIG. 1 includes a first subscriber station 100 (e.g., mobile phone or landline phone), which for purposes of this discussion will be considered to be an originating subscriber station (a station that places a call to be set up). The system also includes a second subscriber station 110, which for purposes of this discussion will be considered to be a subscriber station employing one or more enhanced telecommunication services (e.g., pre-paid calling services) and is the subscriber station to which the call is to be set up. As may be seen in FIG. 1, the subscriber stations 100 and 110 are coupled via a telephony network 120. The telephony network 120 may comprise a single telephony network or may comprise multiple telephony networks, such as a public switched telephone network and/or a mobile telephone network. The telephony network 120 may comprise any number of telecommunication switches and/or other platforms or devices (not shown). Theses switches and platforms/devices may be employed in setting up a call from station 100 to station 110.

The telephony network 120 is coupled with a switch 130, which is in turn coupled with a service control point (SCP) 140 and a service node (SN) 150. As is indicated in FIG. 1, the communication link between the switch 130 and the SCP 140 is a Signaling System 7 (SS7) communication link in accordance with the Wireless Intelligent Network (WIN) IS-771 standard. The SS7 link may be an SS7 over Internet Protocol link. Other types of communication links are, of course, possible. Likewise, as shown in FIG. 1, the communication link between the switch 130 and the SN 150 is an Integrated Services Digital Network User Part (ISUP) communication link. SS7 and ISUP are known and will not be discussed in detail here. Briefly, however, as is known, SS7 communication links are capable of communicating ISUP messages in addition to SS7 messages. Other possibilities for these communication links also exist. In fact, the system shown in FIG. 1 may be implemented as a wireless communication system, a landline communication system, or a combination thereof. The particular devices/platforms and communication links employed may depend on the particular embodiment.

When a request to set up a call to station 110 is placed from the station 100, the call request may be routed through the telephony network 120 to switch 130. Alternatively, the stations 100 and 110 may be coupled directly with the switch 130, depending on the embodiment. The switch 130, in response to receiving the request to set up the call, may generate a first query (or request) to the SCP 140 for call processing assistance. This query may be generated in response to an AIN/WIN trigger if the switch 130 is a mobile switching center (or an AIN trigger if the switch 130 is a landline phone switch).

The SCP 140 contains service logic for providing call processing guidance to the switch 130. The SCP 140's service logic may be implemented as machine executable instructions in the form of software, hardware, firmware, or the like. It is noted that for purposes of this disclosure, service logic may be implemented in any number of manners and is not limited to any particular implementation technique or techniques. For this particular embodiment, the SCP 140 (by applying service logic) determines that the station 110 is a pre-paid calling subscriber and, therefore, the call from station 100 should first be set up to the service node (SN) 150 for pre-paid call processing (e.g., pre-paid balance determination and/or call timer initialization). The SCP 140 then directs the switch 130 to set the call up to the SN 150. The SN 150 then executes pre-paid call processing service logic and generates a second request to set up the call to the station 110, which is sent to the switch 130.

The SN 150 includes, in the second request, a non-loop parameter. For this embodiment, the non-loop parameter includes a predetermined string of digits (e.g., 999-999-9999) that are included in the second request. Alternatively, the non-loop parameter could be a special character or string of characters, among numerous other possibilities. The second request includes an ISUP Initial Address Message (IAM). The non-loop parameter may be included in a ReDirecting-Number parameter or, alternatively, in an Original Called Number parameter in the ISUP IAM. The ReDirectingNumber parameter and the Original Called Number parameter are typically used to facilitate call forwarding functions. Inclusion of the non-loop parameter in one of these fields of the ISUP IAM provides for the prevention of endless looping during call setup without modification to the structure of the ISUP IAM. After inclusion of the non-loop parameter, the ISUP IAM is communicated from the SN 150 to the switch 130.

In response to receiving the second setup request from the SN 150, the switch 130 maps the ISUP IAM, including the non-loop parameter, to an SS7 message. The non-loop parameter is mapped from a parameter of the ISUP LAM message to a parameter of the of the SS7 message. This SS7 message is then sent as a second query (request) to the SCP 140 for call processing assistance. Such ISUP IAM and SS7 messages will be discussed in further detail below with reference to FIGS. 3A and 3B.

Alternatively, for Voice over Internet Protocol (VoIP) telecommunication networks, the non-loop parameter may be communicated using Session Initiation Protocol (SIP) messages. In such an arrangement, the SN would send a SIP INVITE message to the switch that includes the non-loop parameter as part (e.g., as a parameter) of the SIP INVITE message. As with the ISUP LAM, the non-loop parameter may be included in a parameter field of the SIP message that is used for another purpose, such as call forwarding. The switch would then map the non-loop parameter from the SIP INVITE message to the SS7 message in a similar fashion as the ISUP LAM.

The service logic of the SCP 140 includes instructions for detecting the non-loop parameter in the second request (e.g., the SS7 message). Responsive to detecting the non-loop parameter, the SCP 140 will instruct the switch to set up the call to the subscriber station 110, rather than back to the SN 150, thus preventing an endless loop condition, such as was described above. It will be appreciated, as is discussed further below, that the SN 150 may remain in the voice portion of the call path (e.g., to manage the pre-paid calling account information).

For purposes of this disclosure, the signaling discussed for setting up a call from the station 100 to the station 110 is referred to as "out-of-band" signaling. In this context, "out-of-band" signaling means non-voice signals (e.g., data signals). It will be appreciated that the voice path ("in-band") signaling paths and the out-of-band band signaling paths are typically separate signaling paths. For certain types of calls, once the call is set up, there is no additional out-of-band signaling associated with that call. However, situations exist where such out-of-band signaling does continue after the call is set up, such as to disconnect a pre-paid call when the subscriber's pre-paid balance reaches zero.

Alternative System for Setting Up a Call

Figure 2:
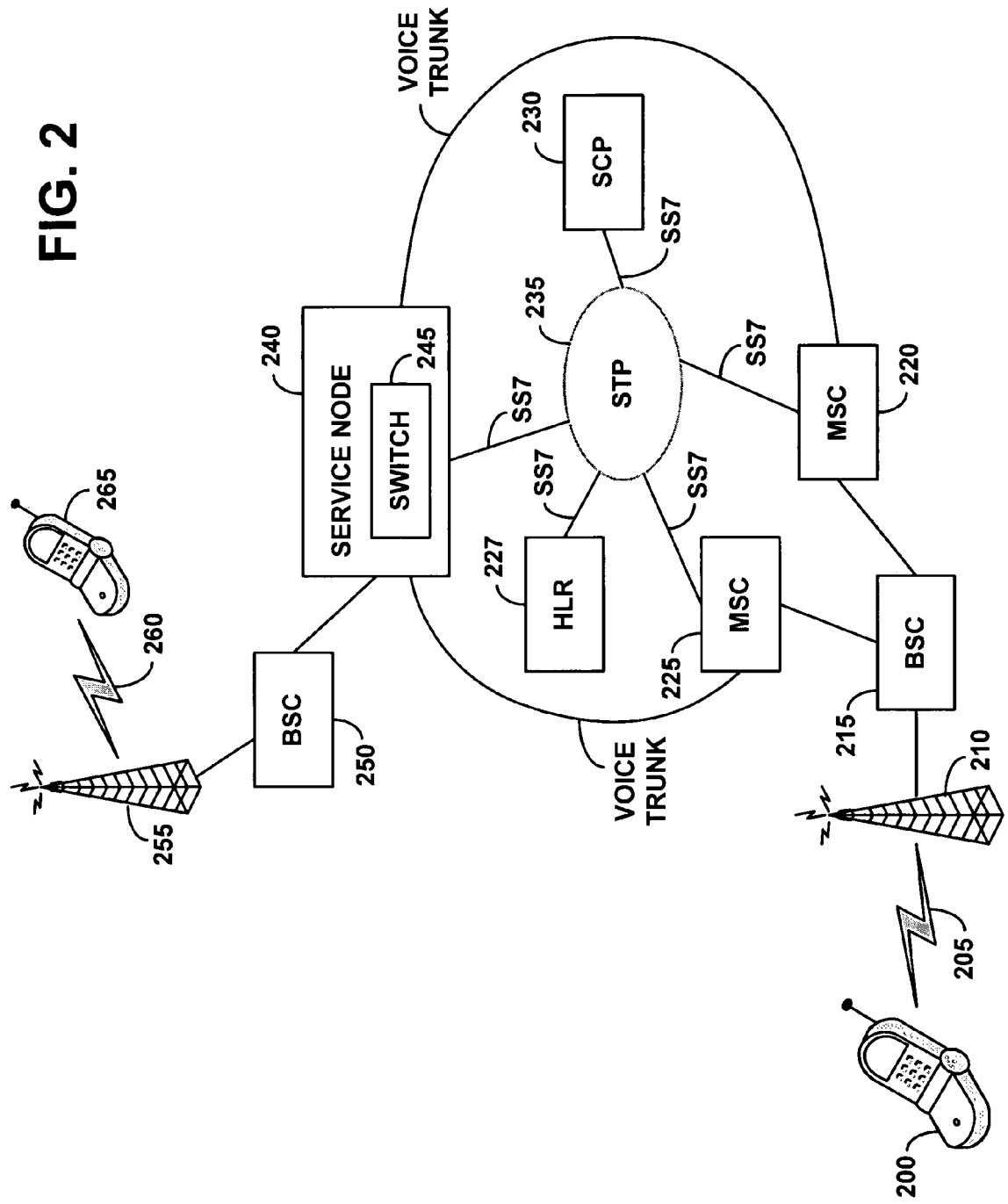
FIG. 2 is a block diagram illustrating a telecommunications system in accordance with another embodiment of the invention.

Referring now to FIG. 2, a block diagram of an alternative system for setting up a call is shown. The system of FIG. 2 is shown as a wireless telecommunication system. However, it will be appreciated that an analogous wired telecommunication system is possible. The system shown in FIG. 2 includes a first subscriber station 200, which is a mobile phone. The station 200 communicates, via a radio interface 205, with a base-transceiver station (BTS) 210. The BTS 210 is coupled with a base-station controller (BSC) 215. As is known, a plurality of switches may be coupled with a BSC, as is shown in FIG. 2. In this respect, the mobile switching centers (MSCs) 220 and 225 are both coupled with the BSC 215. Further, the MSCs 220 and 225 are both coupled with a signal transfer point (STP) 235.

The STP 235 provides for the transfer of signals from one signaling link to another. For the particular embodiment shown in FIG. 2, the STP 235 provides for transferring signals from the SS7 connections coupling the MSCs 220 and 225 with the STP 235 to the other platforms of the system shown in FIG. 2. It further provides for the transfer of signals from the SS7 signaling connection between the STP 235 and a SCP 230 with the other platforms of the system, such as the MSCs 220 and 225. Still further, the STP 235 also provides for the transfer of signals from the SS7 signaling link of a home location register (HLR) 227 and the other platforms of the system, as well as for the transfer of signals from the SS7 signaling link of a service node (SN) 240 and the other platforms.

FIG. 2 also illustrates the voice truck connections (for carrying in-band voice signals) between the MSCs 220 and 225 and the SN 240. It will be appreciated that these voice trunk connections may interface directly with the SN 240 or may interface with the switch 245 that is included in the SN 240. It will be appreciated that the switch 245 may operate independently from the SN 240. In fact, the switch 245 may be physically separate from the SN 240 in certain embodiments.

The SN 240 (such as via the switch 245) is coupled with the BSC 250, which is, in turn, coupled with the BTS 255. The BTS 255 communicates with a subscriber station 265 via a radio interface 260. For the purposes of this discussion, the station 200 will be referred to as the originating station and the station 265 will be referred to as the called station. Thus, for purpose of this discussion, it is assumed that the station 200 places a call to the station 265. Also for purposes of this discussion, it is assumed that the station 265 employs enhanced services that are implemented, at least in part, by the SN 240.

As a result of the station 200 placing a call to be set up to the station 265, a request to set up the call is received at the MSC 220 (or the MSC 225) via the radio interface 205, the BTS 210 and the BSC 215. For purposes of this discussion, it will be assumed the request is received at the MSC 220. As a result of receiving the request, an AIN/WIN trigger is encountered at the MSC 220 and, in response, MSC 220 generates a first query to the SCP 230 for call processing assistance. Upon receiving the query for call processing assistance, the SCP 230 may signal to the HLR 227 to determine a current location of the station 265. The HLR 227 would then signal the SCP 230 (through the STP 235) to indicate that the station 265 is currently communicating with the BTS 255, the BSC 250 and the switch 245. The SCP 230 would then direct the MSC 220 to set up the call to the SN 240 using the voice trunk connection shown in FIG. 2 along with associated out-of-band (e.g., SS7) signaling.

The SN 240 then applies service logic associated with one or more enhanced services employed by the station 265 and generates a second request to set up the call to the station 265. The SN 240 includes a non-loop parameter in the second request. Because the SN 240 includes the switch 245 (and the call is already set up to the SN 240), the second request may be sent to the switch 245 (or alternatively may be sent to the originating switch, the MSC 220). Once the second request is sent to either the switch 245 or the MSC 220, a second AIN/WIN trigger is encountered because the call set up request is still associated with the station 265.

As a result of the second AIN/WIN trigger being encountered, a second query to the SCP 230 is generated by either the switch 245 or the MSC 220, depending on where the second request was communicated to. The service logic of the switch 245 (or of the MSC 220) will map the non-loop parameter from the second request from an ISUP parameter to an SS7 parameter. This non-loop parameter will be detected by the SCP 230, which will, as a result, instruct the switch 245 (or the MSC 220) to set up the call to station 265. Depending on the particular embodiment and the enhanced services employed by the station 265, the SN 240 may or may not remain in the call path. In any event, the switch 245 will remain in the call path until one or both stations disconnect from the call.

ISUP IAM and SS7 Messages

Referring now to FIG. 3A, a diagram illustrating an ISUP IAM message that includes a non-loop parameter is shown. The ISUP IAM shown in FIG. 3A includes a Calling Party Number parameter 300. This parameter includes the phone number "360-555-0000", which may be determined from caller identification information associated with a calling party, such as with the mobile phone 200 in FIG. 2. The ISUP IAM also includes a Called Party Number parameter 310. This parameter includes the phone number "913-555-5555", which is, in this situation, the phone number of the mobile phone 265 in FIG. 2 (e.g., the phone number the originating party dialed).

The ISUP IAM in FIG. 3A also includes a ReDirecting-Number parameter 320, which, as noted above, may be used for call forwarding purposes. However, the ReDirectingNumber parameter 320 in FIG. 3A contains a non-loop parameter "999-999-9999". Such a series of numbers represents a predefined sequence that the service logic of the SCP 230 will recognize as non-loop parameter when included in a request from the switch 220 or 245 for call processing assistance. The ISUP IAM in FIG. 3A also further includes a Original Called Number parameter 330, which is blank. As was discussed above, the non-loop parameter "999-999-9999" may, alternatively, be included in the Original Called Number parameter 330. In this situation, the ReDirectingNumber parameter 320 may be left blank or may be used for other purposes.

Referring now to FIG. 3B, a diagram illustrating an SS7 message is shown. As was discussed above, the SS7 message in FIG. 3B may be mapped from an ISUP IAM message, such as the ISUP IAM message shown in FIG. 3A. Alternatively, the SS7 message in FIG. 3A may be generated from any number of out-of-band message types that include a non-loop parameter, such as a SIP INVITE message for VoIP telecommunication networks, for example.

The SS7 message shown in FIG. 3B includes a Calling Party Number parameter 340 that is mapped from the Calling Party Number parameter 300 of the ISUP IAM message shown in FIG. 3A. The SS7 message also includes a Called Party Number parameter 350 that is mapped from the Called Party Number parameter 310 of the ISUP IAM. The SS7 message shown in FIG. 3B further includes a ReDirecting-Number parameter 360 that includes the non-loop parameter "999-999-9999", which is mapped from the ReDirecting-Number parameter 320 of the ISUP IAM message. Alternatively, the SS7 message in FIG. 3B may include an Original Called Number parameter that includes the non-loop parameter for arrangements where the non-loop parameter is included in the Original Called Number parameter 330 of the ISUP IAM message of FIG. 3A.

Method for Setting Up a Call

Figure 4:
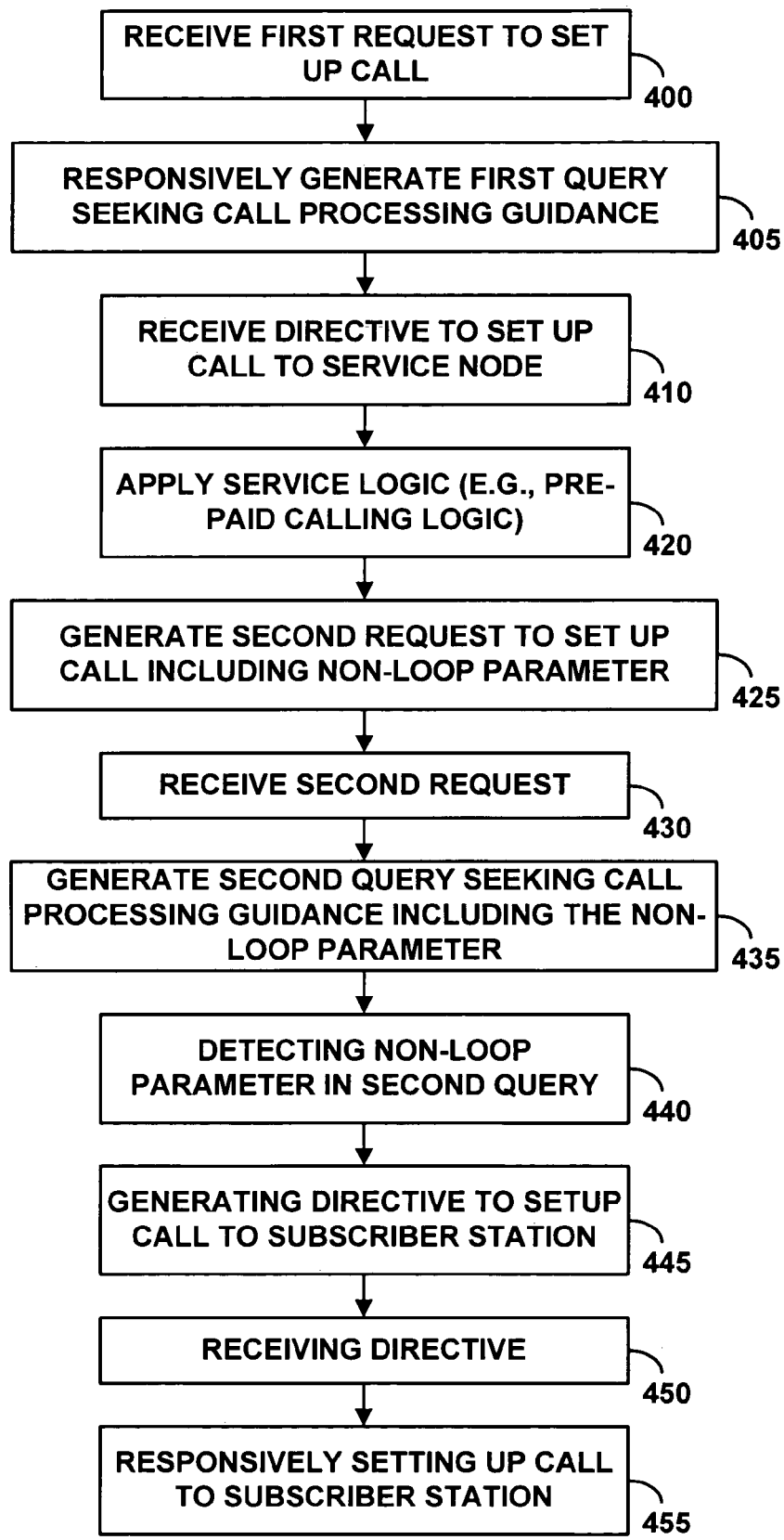
FIG. 4 is a is a flow chart illustrating a method for setting up a call to a subscriber station in accordance with an embodiment of the invention.

Referring now to FIG. 4, a flowchart illustrating a method for setting up a call is shown.

The method of FIG. 4 will be discussed with further reference to FIGS. 1 and 2. The method includes, at block 400, receiving a first request to set up a call, such as at switch 130 in FIG. 1 or one of the MSCs 220 or 225 in FIG. 2. At block 405 the method includes responsively sending, from the switch to an SCP (such as the SCP 140 in FIG. 1), a first query seeking call processing guidance. As has been previously discussed, this query may be generated as a result of an AIN/WIN trigger or merely an AIN trigger, depending on the particular embodiment.

At block 410 the method includes, at the switch, receiving, from the SCP, a directive to set up the call to an SN. At block 420, the method includes applying (e.g., executing) service logic (such as for pre-paid call processing or custom ringback tone processing). At block 425, service logic is applied by the SN to generate a second request to set up the call to the subscriber station, the second request including a non-loop parameter. The method further includes, at block 430, receiving the second request at the switch and, at block 435, generating a second query with the switch to seek call processing guidance from the SCP. As was described above, depending on the particular embodiment, generating the second query may comprise mapping an ISUP IAM to an SS7 message, with the non-loop parameter being mapped from a parameter of the ISUP LAM to a parameter of the SS7 message. In similar fashion as the first query, the second query may be generated as a result of a WIN/AIN trigger being encountered.

At block 440 the method further includes detecting the non-loop parameter in the second query at the SCP, such as by applying service logic. The method of FIG. 4 still further includes responsively sending, from the SCP to the switch, a directive to set up the call to the subscriber station rather than to the SN at block 445. At block 450 the method includes receiving the directive at the switch and, with the switch, responsively setting up the call to the subscriber station instead of the SN; thus avoiding an endless loop condition.

CONCLUSION

Arrangements of the present invention have been described herein. It will be appreciated, however, that those skilled in the art will understand that changes and modifications may be made to these arrangements without departing from the true scope and spirit of the present invention, which is defined by the following claims.

The invention claimed is:

1. A method for setting up a call to a subscriber station comprising:

receiving a first request to set up a call from a calling number to a called number of a subscriber station, the first request carrying the calling number and the called number;

processing the first request at a service node and providing, from the service node, a second request to set up the call to the called number of the subscriber station, the second request including the calling number, the called number, and a non-loop parameter to indicate that call setup signaling has already occurred to the service node and thus to help avoid endless looping of call setup signaling to the service node;

receiving the second request at a switch and responsively sending a service request including the non-loop parameter to a service control point; and detecting the non-loop parameter at the service control point and, in response to at least the non-loop parameter, directing the switch to set up the call to the subscriber station.

2. The method of claim 1, wherein processing the first request comprises applying pre-paid call processing logic.

3. The method of claim 1, wherein processing the first request comprises applying custom ring-back tone processing logic.

4. The method of claim 1, wherein the second request comprises an Integrated Services Digital Network User Part (ISUP) Initial Address Message (IAM), and wherein the non-loop parameter comprises predefined digits included in a ReDirectingNumber parameter of the ISUP IAM.

5. The method of claim 4, wherein the ISUP IAM is mapped to a Signaling System 7 (SS7) message in accordance with the Wireless Intelligent Network (WIN) IS-771 standard.

6. The method of claim 1, wherein the second request comprises an Integrated Services Digital Network User Part (ISUP) Initial Address Message (IAM), and wherein the non-loop parameter comprises predefined digits included in an Original Called Party Number parameter of the ISUP IAM.

7. The method of claim 6, wherein the ISUP IAM is mapped to a Signaling System 7 (SS7) message in accordance with the Wireless Intelligent Network (WIN) IS-771 standard.

8. The method of claim 7, wherein the non-loop parameter is mapped to a WIN parameter in the SS7 message.

9. The method of claim 1, wherein the second request comprises a Session Initiation Protocol (SIP) INVITE message, and wherein the non-loop parameter comprises predefined digits included in a parameter of the SIP INVITE message.

10. The method of claim 9, wherein the SIP INVITE message is mapped to a Signaling System 7 (SS7) message in accordance with the Wireless Intelligent Network (WIN) IS-771 standard.

11. The method of claim 1, wherein receiving the first request at the switch comprises receiving the first request at a mobile switching center.

12. The method of claim 1, wherein receiving the first request at the switch comprises receiving the first request at a public switched telephone network switch.

13. The method of claim 1, further comprising generating one of an Advanced Intelligent Network (AIN) trigger and a Wireless Intelligent Network (WIN) trigger in response to receiving the first request and, as a result, generating a query for seeking call processing guidance from the service control point.

14. A method for setting up a call to a subscriber station comprising:

at a telecommunications switch, receiving a first request to set up the call from a calling number to a called number of the subscriber station;

responsive to the first request, sending, from the switch to a service control point (SCP), a first query seeking call processing guidance;

at the switch, receiving, from the SCP, a response to the first query directing the switch to set up the call to a service node (SN);

at the SN, applying service logic and providing, to the switch, a second request to set up the call to the subscriber station, wherein the second request comprises the calling number, the called number, and a non-loop parameter to indicate that call setup signaling has already occurred to the SN and thus to help avoid endless looping of call setup signaling to the SN;

receiving the second request at the switch;

responsive to the second request, sending, from the switch to the SCP, a second query seeking call processing guidance, the second query including the non-loop parameter;

detecting the non-loop parameter in the second query at the SCP, and responsively sending, from the SCP to the switch, a directive to set up the call to the subscriber station rather than to the SN; and receiving the directive at the switch and responsively setting up the call to the subscriber station.

15. The method of claim 14, wherein applying the service logic in the SN comprises applying pre-paid call processing logic.

16. The method of claim 14, wherein applying the service logic in the SN comprises applying custom ring-back tone processing logic.

17. The method of claim 14, wherein the second request comprises an Integrated Services Digital Network User Part (ISUP) Initial Address Message (IAM), and wherein the non-loop parameter comprises predefined digits included in a ReDirectingNumber parameter of the ISUP IAM.

18. The method of claim 14, wherein the second request comprises an Integrated Services Digital Network User Part (ISUP) Initial Address Message (IAM), and wherein the non-loop parameter comprises predefined digits included in an Original Called Party Number parameter of the ISUP IAM.

19. The method of claim 14, further comprising generating a Wireless Intelligent Network (WIN) trigger in response to receiving the first request at the switch, wherein the first query is generated in response to the WIN trigger.

20. The method of claim 14, wherein the second query is generated in response to a Wireless Intelligent Network (WIN) trigger, and wherein the WIN trigger is generated as a result of the switch receiving the second request.

21. A system for setting up a telephone call comprising:

a switch for receiving a first request to set up the telephone call from a calling number to a called number of a subscriber station;

a service control point (SCP) coupled with the switch, the SCP comprising service logic for providing call processing guidance to the switch; and a service node (SN) coupled with the switch for providing one or more telecommunication services to the subscriber station, the SN comprising service logic for generating and sending a second request to the switch to set up the call to the subscriber station, the service logic including instructions for including in the second request (i) the calling number, (ii) the called number, and (iii) a non-loop parameter to indicate that call setup signaling has already occurred to the SN and thus to help avoid endless looping of call setup signaling to the SN, wherein the service logic of the SCP comprises instructions for recognizing the non-loop parameter in the second request and further instructions for responsively providing guidance to the switch to set up the call to the subscriber station rather than again to the SN.

22. The system of claim 21, further comprising a signal transfer point (STP), wherein the switch and the SCP are coupled via the STP, and the switch and the SN are also coupled via the STP.

23. The system of claim 22, wherein the SCP is coupled with the STP via a Signaling System 7 (SS7) communication link.

24. The system of claim 23, wherein the SS7 communication link is an SS7 over Internet Protocol link.

25. The system of claim 21, wherein the switch is coupled with the SN via a voice services trunk connection.

* * * * *

UNITED STATES PATENT AND TRADEMARK OFFICE
CERTIFICATE OF CORRECTION

PATENT NO. : 7,596,219 B1
APPLICATION NO. : 10/821565
DATED : September 29, 2009
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1573 days.

Signed and Sealed this

Twenty-eighth Day of September, 2010

David J. Kappos
*Director of the United States Patent and Trademark Office*